(12) United States Patent
Bergmann et al.

(10) Patent No.: US 9,342,395 B2
(45) Date of Patent: *May 17, 2016

(54) ERROR CHECKING USING SERIAL COLLECTION OF ERROR DATA

(71) Applicant: International Business Machines Corporation, Armonk, NY (US)

(72) Inventors: Tobias U. Bergmann, Weinstadt (DE); Guenter Gerwig, Simmozheim (DE); Scott B. Swaney, Germantown, NY (US); Tobias Webel, Schwaebisch-Gmuend (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,714

(22) Filed: Sep. 30, 2014

(65) Prior Publication Data
US 2015/0261593 A1 Sep. 17, 2015

Related U.S. Application Data

(63) Continuation of application No. 14/212,466, filed on Mar. 14, 2014.

(51) Int. Cl.
*G06F 11/00* (2006.01)
*G06F 11/07* (2006.01)
*G06F 11/30* (2006.01)

(52) U.S. Cl.
CPC ........ *G06F 11/0772* (2013.01); *G06F 11/0724* (2013.01); *G06F 11/0787* (2013.01); *G06F 11/30* (2013.01)

(58) Field of Classification Search
CPC ............ G06F 11/0751; G06F 11/0772; G06F 11/0778; G06F 11/0787; G06F 11/0766; G06F 11/0724; G06F 11/30
See application file for complete search history.

(56) References Cited

U.S. PATENT DOCUMENTS

| 5,448,725 | A | 9/1995 | Gervais |
| 7,467,325 | B2 | 12/2008 | Eisen et al. |
| 2008/0126830 | A1* | 5/2008 | Balazich ............. G06F 11/0772 714/2 |

* cited by examiner

*Primary Examiner* — Bryce Bonzo
*Assistant Examiner* — Anthony J Amoroso
(74) *Attorney, Agent, or Firm* — Cantor Colburn LLP; William A. Kinnaman, Jr.

(57) ABSTRACT

Embodiments relate to implementing error data collection for a processor. Aspects of the embodiments include identifying a plurality of error state devices in a processor, each of the plurality of error state devices configured to hold a state indication, and organizing the plurality of error state devices as a sequence. Aspects also include collecting a plurality of state indications by serially sampling the state indication from each of the plurality of error state devices in an order corresponding to the sequence, sequentially storing the plurality of state indications as a single linear data array, and outputting the linear data array as a data structure. The data structure can include information regarding one or more error events based on one or more errors occurring in the processor.

18 Claims, 4 Drawing Sheets

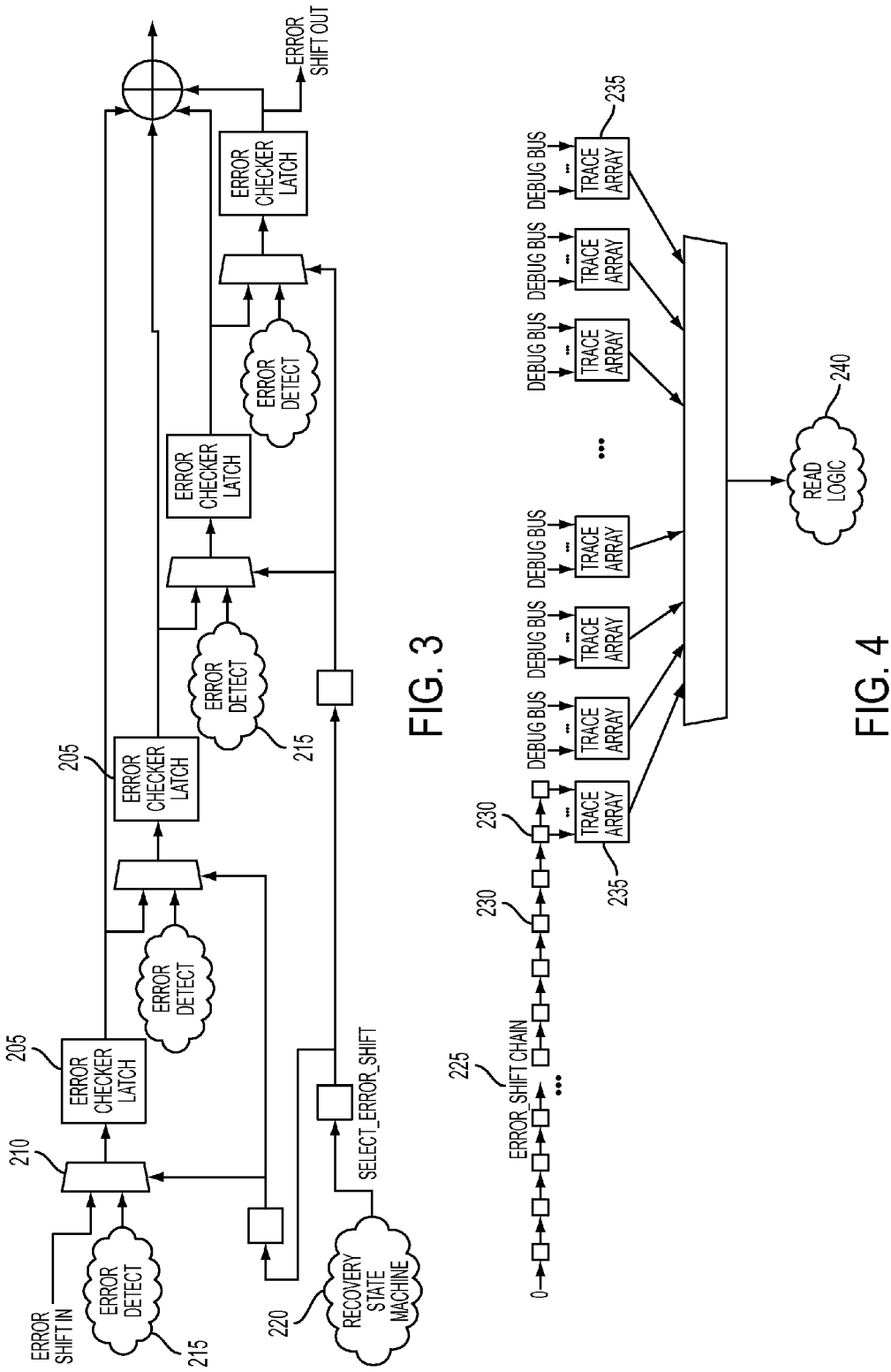

ERROR CHECKING USING SERIAL COLLECTION OF ERROR DATA

DOMESTIC PRIORITY

This application is a continuation application of the legally related U.S. Ser. No. 14/212,466 filed Mar. 14, 2014, the contents of which are incorporated by reference herein in their entirety.

BACKGROUND

The present invention relates generally to error checking in processing devices and systems, and more specifically, to error checking using serial collection of error data.

Error detection and diagnosis is routinely used in processing devices and systems, such as desktop computers, networks, mainframes and servers. For example, IBM System z mainframe servers and power servers have robust error detection that includes various registers for detection of errors and collection of error data.

Some circuit failures are expected in any modern technology, such as charged-particle induced soft errors in arrays, and recovery from these expected circuit failures is important for continuous availability. Granular fault isolation is used to distinguish "expected" circuit failures from "unexpected" failures, or even design problems, where corrective actions may be necessary to avoid a dangerous condition or guarantee recoverability.

As circuit density and design complexity has increased dramatically over generations, so has the number of error checkers required for robust error detection. Maintaining granular fault and error detection, in many instances, requires additional circuit real estate and power consumption to keep up with improvements in processing capability.

SUMMARY

An embodiment of a computer program product for implementing error data collection includes a computer readable storage medium having program instructions embodied therewith, the program instructions readable by a processing circuit to cause the processing circuit to perform a method. The method includes identifying a plurality of error state devices in a processor, each of the plurality of error state devices configured to hold a state indication, and organizing the plurality of error state devices as a sequence. The method also includes collecting a plurality of state indications by serially sampling the state indication from each of the plurality of error state devices in an order corresponding to the sequence, sequentially storing the plurality of state indications as a single linear data array, and outputting the linear data array as a data structure, the data structure including information regarding one or more error events based on one or more errors occurring in the processor.

An embodiment of a computer implemented method for collecting error data includes identifying, by a processing unit, a plurality of error state devices in a processor, each of the plurality of error state devices configured to hold a state indication. The method also includes organizing the plurality of error state devices as a sequence, collecting a plurality of state indications by serially sampling the state indication from each of the plurality of error state devices in an order corresponding to the sequence, sequentially storing the plurality of state indications as a single linear data array, and outputting the linear data array as a data structure, the data structure including information regarding one or more error events based on one or more errors occurring in the processor.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts aspects an architecture for collecting error data from a plurality of error state devices in accordance with an embodiment;

FIG. 4 depicts an example of a linear data array for storage of the error data of FIG. 3, in accordance with an embodiment;

DETAILED DESCRIPTION

Apparatuses, systems and methods are provided for collection and analysis of error data in processing devices and systems. An embodiment of an error collection unit or mechanism is configured to dynamically organize a plurality of error state devices associated with error checkers in a processing device or system. The error state devices are organized as a single serial chain, and sampled to a single linear data array, such as a linear data stream or bit stream. In one embodiment, the error state devices are sampled via a scan chain into an instance of a trace array, which is read to a selected location to allow for highly granular analysis of error events. In one embodiment, a common value (e.g., zero) is set for each state device as the chain is sampled, e.g., by holding the common value at the beginning of the scan chain during sampling. The error collection mechanism or unit may be used for error collection during recovery actions and/or during normal processing.

Embodiments described herein allow for fine-grained error checking and analysis in an efficient manner. For example, all of the error checker latches or other error state devices in a processor or processing device (e.g., central processor or core) can be efficiently sampled into a single bit stream. This allows for simpler, faster, and more complete analysis of recovered events across the field to allow proactive, corrective actions to avoid customer outages and maintain continuous availability.

Typical processing devices such as servers have error detection that relies on Fault Isolation Registers (FIRs) and "Who's On First" (WOF) registers to identify the source of a detected error. Exemplary error detection mechanisms that utilize such registers are described in U.S. Pat. No. 7,467,325, "Processor instruction retry recovery," filed on Feb. 10, 2005, and in U.S. Pat. No. 5,448,725, "Apparatus and method for error detection and fault isolation," filed on May 5, 1994, the contents of which are incorporated herein by reference in their entirety.

Due to increases in circuit density and complexity, the number of error checkers has increased significantly. The use of existing techniques of OR-ing bundles of error checkers into FIR/WOF registers for granular fault detection requires circuit real estate use and power consumption that is increasingly prohibitive.

The embodiments described herein address such disadvantages by providing a mechanism for capturing many or all of the error checkers in a processor during, e.g., a recovery event, in contrast to using only FIR/WOF registers which typically only isolate a few percent of the error checkers. For example, the embodiments described herein allow for 100% fault isolation in a processor at a fraction of the real estate and power consumption that would be required to expand existing FIR/WOF structures to provide anywhere near as good fault isolation.

Figure 1:
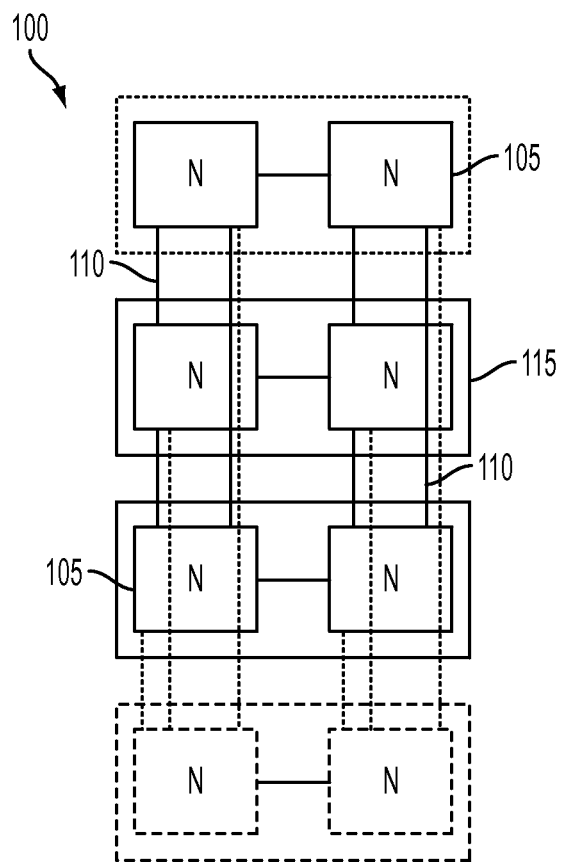
FIG. 1 depicts a processing system in accordance with an embodiment.

Turning now to FIG. 1, an embodiment of a computing, processing and/or data management system 100 is generally shown. The system 100 includes multiple nodes 105 connected in communication with one another via suitable connectors 110 such as wires, cables and optical fibers. The nodes 105 may be any processing and/or storage system such as a computer, server, data center, cache system or mainframe computer. The connectors 110 may include any of various connectors, ports, switches and other devices, and with the nodes 105 form a network or fabric. The nodes 105 can be configured as, e.g., servers 115 or other multi-node computing device, but are not so limited.

Figure 2:
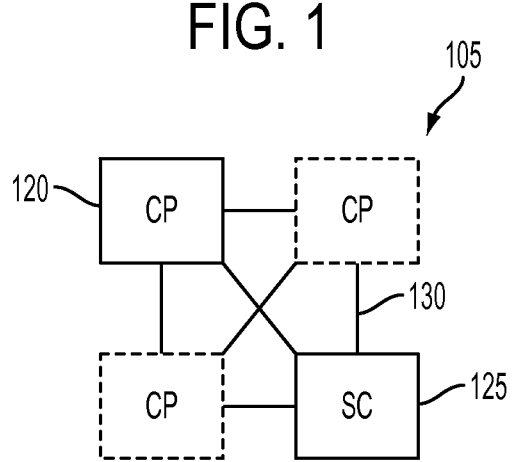
FIG. 2 depicts a node of the processing system of FIG. 1 in accordance with an embodiment.

FIG. 2 illustrates an exemplary data storage and/or processing system that may form all or part of a node 105. A plurality of central processors (CP) 120 are operatively connected to one another and/or to other components, such as a storage control (SC) processor 125. In one embodiment, the CPs 120 and the SC 125 are integrated in a package such as a multi-chip module (MCM) and connected via conductors 130. In one example, the MCM is a component of a data center, mainframe, server or other data storage device. In this embodiment, the MCM may be connected to memory devices such as disk drives or tape drives. The MCM may also be connected in communication with other nodes 105 via fabric connectors, channels and/or other connectors.

In one embodiment, the system and/or node includes error collection functionality for collecting error data from error detection circuitry in a processor. The error collection function may be embodied in circuitry or as a logical entity, e.g., as a functional unit or part of a functional unit. A resource configured to perform the error collection functions and methods described herein is referred to as an error collection unit. The error collection unit may be any type of physical or logical processing device capable of performing the methods described herein.

The error collection unit is configured to sample error data in the form of, e.g., state information from a plurality of error state devices in a processor. The processor may be any type of processor, such as a microprocessor, mobile or desktop computer, mainframe or server. Exemplary processors from which error data can be sampled or collected include a node 105, a MCM, a CP 120, a core within the CP 120 and/or functional units within the core.

In one embodiment, the error collection unit is configured to collect error data by organizing all or some of the error state devices in a processor into a linear sequence, i.e., selecting an order in which each error state device is to be sequentially sampled. The error state devices are serially sampled to collect a state indication from each error state device. The state indications are stored in a linear, one-dimensional data array.

In one embodiment, the error collection unit organizes the error state devices into a serial shift chain or scan chain. The scan chain represents a serial path connecting all of the error checker latches in the processor. The scan chain serially samples each error state device into a bit string or other linear data array. In one embodiment, the data array is stored as a trace array instance.

Referring now to FIG. 3, an architecture showing aspects of an embodiment of an error collection system 200 is shown. The system 200 may be included with any type of processing device or system, such as the system 100 and/or node 105.

The error collection system 200 is operably connected to a processor (e.g., a processor, core central processor, MCM) that includes error detection circuitry. The error detection circuitry includes a plurality of error state devices that store an indication of whether an error occurred at some location in the processor and/or at some point during processing. Such circuitry is typically located throughout the processor and through functional units in the processor. Exemplary functional units include pre-fetch units, cache units, bus interface units, and operation units (e.g., floating point units). The error detection circuitry for a processor can include a large number of error state devices, e.g., in the thousands.

Exemplary error state devices are error checker latches 205, each of which store an error state. Each latch 205 is connected to a specific error checking circuit or component, which is referred to as an "error checker." Each error checker latch 205 is coupled to a multiplexer 210 and receives a signal 215 (e.g., an "error detect" signal) when the corresponding error checker detects an error.

When error collection is desired, the system 200 performs an error collection method or procedure that includes identifying all of the error checker latches 205 in the processor. In one embodiment, the system 200 only identifies latches or other state devices in the processor that provide error information.

The system 200 arranges the error checker latches 205 as a single sequence. This arrangement includes selecting an order in which the latches 205 are to be sampled. In one embodiment, the order of the latches 205 is selected for use in a serially shifted chain, which is used to sample the latches 205 into a linear data array such as an instance of a trace array.

A processing unit 220, such as a recovery state machine, selects each latch 205 in succession and stores a sample of each latch in a data array. The recovery state machine selects a first latch 205, and the latch is sampled by storing the latch's state indication in the array. The data array is then shifted to the next latch 205 and the next latch 205 is sampled. This is repeated sequentially through all of the latches 205, and the full array is output to a storage location For example, an error shift chain 225 is shifted through the first latch 205 and a first sample 230 is added. The chain 225 is then shifted through the second latch 205 and a second sample 230 is added. This is repeated until all of the latches are sampled into the data array.

In one embodiment, the data array is an instance of a trace array that is stored in the processor. In the embodiment shown in FIG. 4, each instance is shown as a trace array 235. Each trace array instance, in one embodiment, is added as an instance to one or more other instances of trace arrays that are stored. Trace arrays are utilized, for example, by hardware and/or software monitors that monitor system operations. Such monitors may periodically sample system signals into trace arrays that are stored via, e.g., data tables, registers or other structures or storage devices.

As the latches 215 are sampled to the trace array 235, bits are added to the end of the chain 225 as the chain 225 is shifted through each latch. In one embodiment, as the chain 225 is shifted, a "zero" or other common value is held at the input of the beginning of the chain 225 to clear or reset each latch 205 as the chain is shifted. Serially shifting using a common value as the first bit allows the scan chain 225 to set all of the latches 205 to an initial state as the chain 225 moves through the scan path.

In one embodiment, the trace array is added as an instance in addition to other trace array instances that already exist. For example, there are many trace array instances which get logged by firmware after recovery, so no additional "infrastructure" is required. Our preferred embodiment uses one additional instance of a trace array to capture and store the values of all the thousands of error checkers in the core.

As is shown in FIG. 4, a separate data array can be used to sample error state devices in different processors or processor components. For example, the system 200 produces a separate trace array 235 for each functional unit in a core. The trace arrays 235 can be multiplexed and output to a location using, e.g., read logic 240. In this way, granular error data for all of the units in the core is output for analysis.

Figure 5:
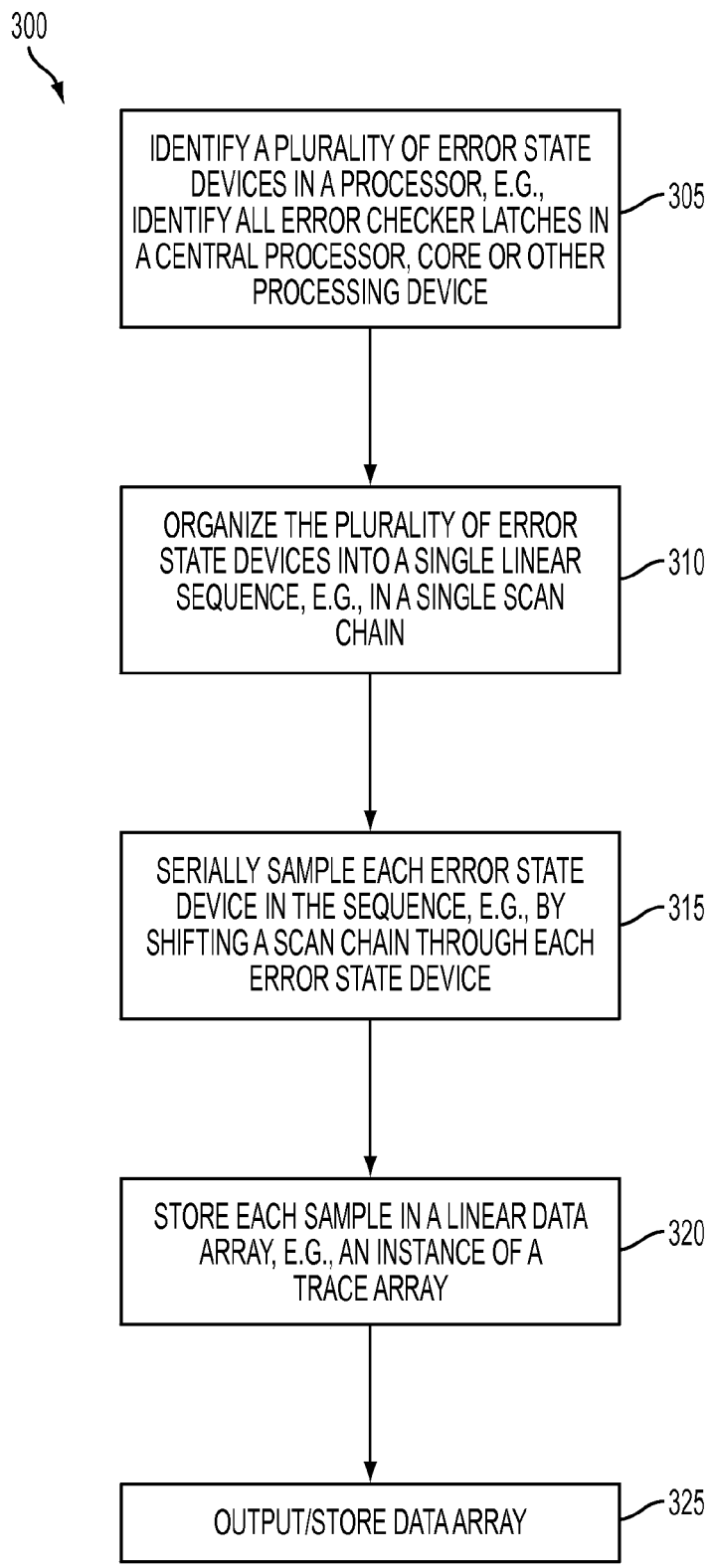
FIG. 5 depicts a process flow for collecting error data in accordance with an embodiment.

FIG. 5 illustrates an embodiment of a method 300 of collecting error data. Although the method 300 is described in conjunction with the system 200, the method 300 can be utilized in conjunction with any of the processing devices and systems described herein, as well as with any device or system that includes error checking or diagnostic capability.

At block 305, when error collection is desired, a processing device or unit such as an error collection unit identifies error state devices, such as the error checker latches 205, in a processor. The error collection unit identifies all state devices that have states that provide error information, e.g., indicate whether an error has occurred. Error collection can be initiated at any time during processing, for example, when an error is detected or at pre-selected times during processing. In one embodiment, error collection is initiated when the processor enters a recovery mode (e.g., during a "recovery reset" step of a core or CP refresh sequence).

At block 310, the error collection unit organizes the plurality of error state devices as a single sequence, e.g., in a single scan chain. For example, the error checker latches 205 are organized as a single scan chain 225.

At block 315, the error collection unit successively samples the state indication from each of the plurality of error state devices according to the sequence. In one embodiment, the error collection unit collects the state indications via a serial shift chain.

At block 320, the processing unit stores each state indication in a serial manner in a linear data array. The linear data array is a one-dimensional data array in which each sample is successively stored as one or more bits or data words. In one embodiment, each sample is stored as a scan word into a trace array as the scan chain is shifted through the error state devices. A trace array, in one embodiment, is arranged as a two-dimensional array of a number "n" of entries, each entry having a word with a certain size "y", e.g., a number of bits. In one embodiment, the error collection unit creates or utilizes an instance of a trace array and stores the sampled state indications to the trace array as the chain is shifted and samples are collected.

In one embodiment, the error collection unit samples the error state devices at full frequency, i.e., samples at the same clock rate as the clock rate of the processor. This can allow for a fine grain collection of error data.

At block 325, the data array is output to a selected location, such as a diagnostic unit in the processing device or to an external location. The data array provides a highly granular description of errors that occur during processing.

It is noted that the method 300 can be performed in response to the processor going into recovery mode, in response to an error detection, or at any other time. In addition, the method 300 can be performed to recover error data without requiring the processor to stop and go into recovery mode.

In one embodiment, the trace array instance or other data array is used to collect error data at multiple time periods representing multiple recovery actions or recoverable events. For example, the trace array is of sufficient length to capture two scans, e.g., by being internally organized as having two banks of half the trace array's original size. In this way, the error collection unit can provide full error collection for at least two recoverable events in a single trace array.

Technical effects and benefits include the ability to collect error data in a highly granular fashion while using less real estate, processing power and power consumption than other techniques. In typical systems, in order to achieving such fine grain checking, many fault isolation lines (requiring wiring and many fault isolation registers) would be needed, which takes up valuable space. In addition, scaling becomes a problem, especially when the number of error signals reaches the thousands. The embodiments described herein provide a mechanism for cost efficient (e.g., bit efficient) fine-grain error checking that can be easily scaled and implemented without requiring additional hardware or instrumentation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 6:
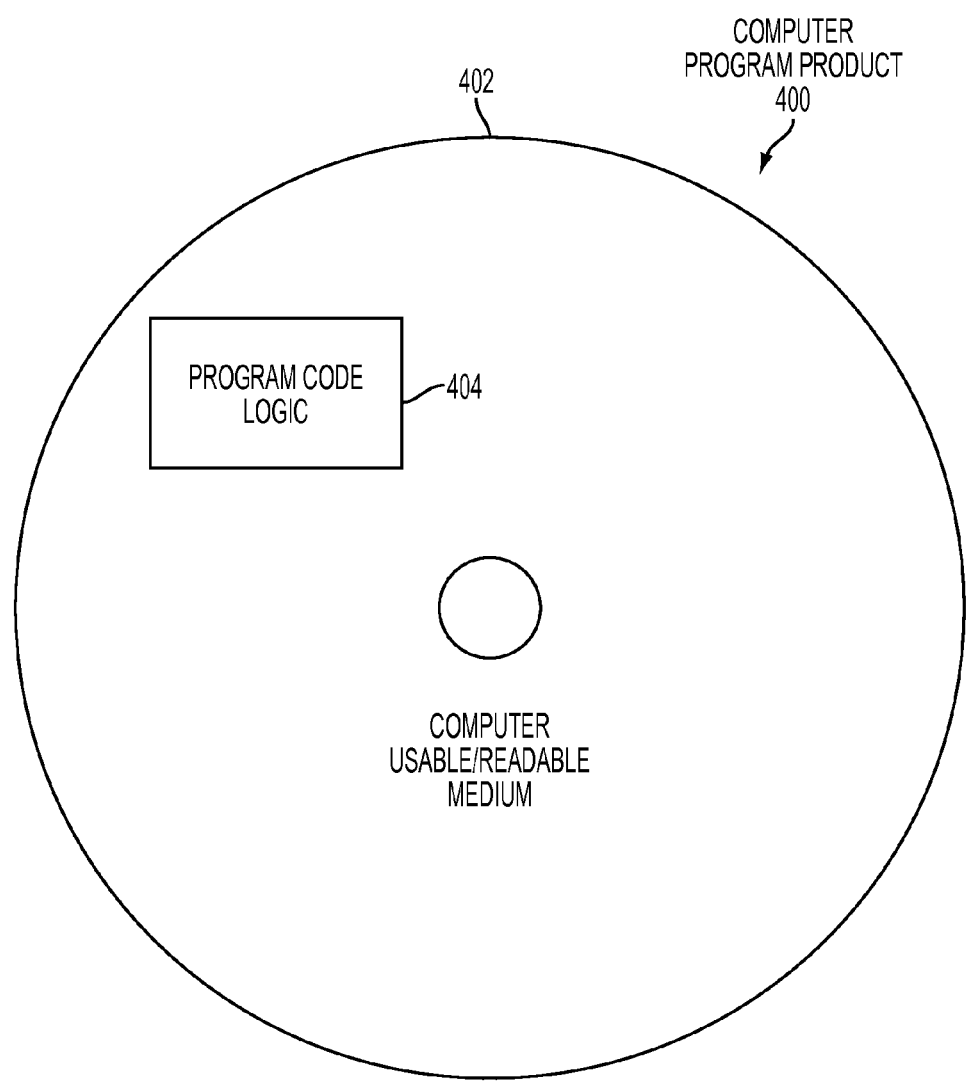
FIG. 6 depicts a computer-readable medium according to an embodiment.

Referring now to FIG. 6, in one example, a computer program product 400 includes, for instance, one or more storage media 402, wherein the media may be tangible and/or non-transitory, to store computer readable program code means or logic 404 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for implementing error data collection, the computer program product comprising:
 a computer readable storage medium having program instructions embodied therewith, wherein the computer readable storage medium is not a signal, the program instructions readable by a processing circuit to cause the processing circuit to perform a method comprising:
 identifying a plurality of error state devices in a processor, each of the plurality of error state devices configured to hold a state indication;
 organizing the plurality of error state devices as a single sequence;

collecting a plurality of state indications by sequentially sampling the state indication from each of the plurality of error state devices in an order corresponding to the sequence, wherein the sampling includes serially shifting a data array through each error state device in the sequence and outputting the state indication;

sequentially storing each state indication into a single linear data array according to the sequence; and outputting the linear data array as a data structure, the data structure including information regarding one or more error events based on one or more errors occurring in the processor.

2. The computer program product of claim 1, wherein organizing includes organizing the plurality of error devices into a single scan chain.

3. The computer program product of claim 2, wherein sampling includes serially shifting the scan chain and storing each state indication in the linear data array.

4. The computer program product of claim 1, wherein the plurality of error state devices are a plurality of error checker latches, each error checker latch configured to receive an error signal from a location in the processor.

5. The computer program product of claim 1, wherein the linear data array is an instance of a trace array.

6. The computer program product of claim 1, wherein the processor is one of a plurality of functional units, and the method is performed for each of the plurality of functional units to produce a linear data array for each of the plurality of functional units.

7. The computer program product of claim 1, wherein sampling the state indication includes setting an error state device to a common value upon sampling the error state device and prior to sampling a subsequent error state device in the sequence.

8. The computer program product of claim 1, wherein the method is performed based on the processor entering a recovery mode.

9. The computer program product of claim 1, wherein the linear data array includes a first state indication from each of the plurality of error state machines sampled during a first time period, and includes a second state indication from each of the plurality of error state devices sampled during a second time period.

10. A computer implemented method for collecting error data, the method comprising:

identifying, by a processing unit, a plurality of error state devices in a processor, each of the plurality of error state devices configured to hold a state indication;

organizing the plurality of error state devices as a single sequence;

collecting a plurality of state indications by sequentially sampling the state indication from each of the plurality of error state devices in an order corresponding to the sequence, wherein the sampling includes serially shifting a data array through each error state device in the sequence and outputting the state indication;

sequentially storing each state indication into a single linear data array according to the sequence; and outputting the linear data array as a data structure, the data structure including information regarding one or more error events based on one or more errors occurring in the processor.

11. The method of claim 10, wherein organizing includes organizing the plurality of error devices into a single scan chain.

12. The method of claim 11, wherein sampling including serially shifting the scan chain and storing each state indication in the linear data array.

13. The method of claim 10, wherein sampling the state indication includes setting an error state device to a common value upon sampling the error state device and prior to sampling a subsequent error state device in the sequence.

14. The method of claim 10, wherein the plurality of error state devices are a plurality of error checker latches, each error checker latch configured to receive an error signal from a location in the processor.

15. The method of claim 10, wherein the linear data array is an instance of a trace array.

16. The method of claim 10, wherein the processor is one of a plurality of functional units, and the method is performed for each of the plurality of functional units to produce a linear data array for each of the plurality of functional units.

17. The method of claim 10, wherein the method is performed based on the processor entering a recovery mode.

18. The method of claim 10, wherein the linear data array includes a first state indication from each of the plurality of error state machines sampled during a first time period, and includes a second state indication from each of the plurality of error state devices sampled during a second time period.

* * * * *